United States Patent [19]

Alfano et al.

[11] Patent Number: 5,368,830
[45] Date of Patent: Nov. 29, 1994

[54] SCALE CONTROL IN GOLD AND SILVER MINING HEAP LEACH AND MILL WATER CIRCUITS USING POLYETHER POLYAMINO METHYLENE PHOSPHONATES

[75] Inventors: Nicholas J. Alfano, Pittsburgh; Bennett P. Boffardi, Bethel Park, both of Pa.

[73] Assignee: Calgon Corporation, Pittsburgh, Pa.

[21] Appl. No.: 961,570

[22] Filed: Oct. 15, 1992

[51] Int. Cl.$^5$ .................................. C02F 5/14
[52] U.S. Cl. .................................. 423/29; 252/180; 210/700; 210/701; 203/7
[58] Field of Search ............... 210/700, 701; 252/180, 252/289.22; 423/29; 203/7

[56] References Cited

U.S. PATENT DOCUMENTS

| | | | |
|---|---|---|---|
| 4,867,882 | 9/1989 | O'Neill et al. | 423/29 |
| 4,931,189 | 6/1990 | Dhawan et al. | 210/700 |
| 4,971,625 | 11/1990 | Bahr | 423/29 |
| 5,087,376 | 2/1992 | Bendiken et al. | 210/701 |
| 5,112,496 | 5/1992 | Dhawan et al. | 210/700 |
| 5,262,061 | 11/1993 | Gill et al. | 210/700 |
| 5,300,231 | 4/1994 | Cha | 210/700 |

Primary Examiner—Richard D. Lovering
Assistant Examiner—Valerie Fee
Attorney, Agent, or Firm—Craig G. Cochenour; William C. Mitchell; Michael J. Kline

[57] ABSTRACT

Calcium carbonate scale deposits, occurring in gold and silver mining involving the cyanidation process which utilizes heap and vat leaching, and carbon-in-pulp, carbon-in-leach, particularly activated carbon separation columns; said scale deposits forming on the carbon surfaces and in the emitters and sprinklers of the heap leaching system, are controlled using polyether polyamino methylene phosphonates, which provide effective inhibition despite the severe conditions encountered in these systems, including very high pH's.

11 Claims, No Drawings

5,368,830

SCALE CONTROL IN GOLD AND SILVER MINING HEAP LEACH AND MILL WATER CIRCUITS USING POLYETHER POLYAMINO METHYLENE PHOSPHONATES

BACKGROUND OF THE INVENTION

1. Field of the Invention

The present invention relates to compositions and methods for inhibiting the formation, deposition and adherence of calcium carbonate ($CaCO_3$) scale deposits, on various metallic, activated carbon and other surfaces of aqueous systems involved in heap and vat leaching; carbon-in-pulp, carbon-in-leach, and other activated carbon leaching and adsorption recovery systems; and various other mill water circuits used to carry out the basic cyanidation process for extracting precious metals, especially gold and silver, from crude ores, especially low grade ores containing them, where the cyanidation process is combined with the use of activated carbon, utilized in various ways, to recover the precious metals from large volumes of low-grade pregnant solutions containing water soluble cyanide salts of the precious metals created by the leaching step of the cyanidation process.

The cyanidation process for extracting precious metals from their ores, especially gold and silver, is well known in the art; and it is typically employed where the gold and silver particles in an ore deposit are too fine-grained or too low-grade to be concentrated by gravity and/or flotation techniques. The cyanidation process is extensively used because of its economy and technological simplicity.

Heap and Vat Leaching

In accordance with the cyanidation process where heap leaching is employed, a heap pile of crude ore is formed, usually low grade and substantial in size, and a water solution of sodium cyanide and sodium hydroxide or lime is then used to extract the precious metal from its ore as a water soluble cyanide salt. Sufficient caustic or lime is added to maintain the solution pH above 10.0. For a crude ore which consists primarily of gold, a dilute solution of about 1 lb of sodium cyanide per ton of water is typically prepared to dissolve the gold and leach it from the heap pile. For an ore containing significant amounts of silver, the cyanide strength of the solution is usually doubled.

Since oxidizing conditions must be maintained in order for the cyanidation process to proceed, about 1 to 2 lb per short ton of ore of sodium hydroxide or lime is added to keep the system at an alkaline pH of 10–11. Acid is generated during cyanidation and the alkaline pH prevents cyanide degeneration, which can lead to the formation of deadly HCN gas. While lime is significantly less expensive than sodium hydroxide in achieving alkaline pH's, it suffers from the disadvantage of causing the formation of calcium carbonate scale deposits at various points in the aqueous systems involved in the cyanidation process.

Thus, it is a significant contribution of the method of the present invention that by the addition of small amounts of polyether polyamino methylene phosphonates to said systems, optionally combined with various polymer additives described in detail further below, it is possible to substantially inhibit the formation of such calcium carbonate scale deposits, thereby allowing the use of the less expensive lime, rather than sodium hydroxide, in maintaining alkaline pH's for the cyanidation process.

In heap leaching, the heap pile may comprise from 5 thousand to 2 million tons of low-grade ore, from which from 60 to 70% of the precious metals contained in the ore will be recovered. Where the ore has a high clay content, agglomeration with, e.g., Portland cement, lime, water and cyanide is typically used in order to assure uniform feed and permeability throughout the heap. Once the heap has been prepared, sprinkler or emitter systems of various designs apply from 4 to 75 $gal/ft^2/$ day of dilute alkaline cyanide solution prepared by adding from 1 to 4 lb of sodium cyanide per ton of water. Large drop sprayers are preferably used for this application, and the cyanide solution thus applied dissolves the gold and silver in the ore as it percolates through the oxygenated heap, and the "pregnant" solution thereby created drains from the bottom of the heap to plastic-lined channels and finally to a pregnant solution storage basin. The pregnant solution may then be processed through various precious metal recovery systems, but the one with which the present invention is concerned and for which it constitutes an improvement, is that using activated carbon in various systems, described in detail further below. Once the pregnant solution has been stripped of precious metal, cyanide and lime are added to the "barren" solution to bring it back up to pH 10–11 and the required cyanide concentration. This revitalized cyanide solution is then recycled to the heap.

As the above description will make apparent, there are a number of points in the aqueous system involved in leaching of the precious metals from the heap pile of ore where the formation of calcium carbonate scale deposits may occur and pose a problem. The most significant of these is at the sprinkler nozzle or other emitter source where the alkaline cyanide solution is applied to the heap pile. At this point evaporation of the water from the cyanide solution will leave a scale deposit which, over time, can clog the nozzle or emitter. However, there are obviously other points in this aqueous system where scale deposits can form, e.g., the lines, pumps and storage tanks for removing, transporting, and recycling of the pregnant and barren cyanide solutions. Calcium carbonate scale can also be a significant problem on the heat exchangers and pipes of activated carbon stip circuits where the precious metal cyanides are desorbed from the activated carbon recovery units using conventional methods. The polyether polyamino methylene phosphonates, optionally combined with various polymer additives, utilized in the method of the present invention, inhibit the formation of such calcium carbonate scale deposits at all such sites in the aqueous system involved in leaching of precious metals from their ores in the cyanidation process.

At lower temperatures and pressures the cyanidation process is significantly less efficient, due to reduced oxygen activity. Since these environmental conditions are oftened encountered in typical gold and silver mining operations carried out in mountainous regions, it is not uncommon to find year-round leaching operations carried out in indoor vats and activated carbon adsorption recovery columns. However, the problems of calcium carbonate scale deposition described herein, both with respect to the leaching operation and the carbon recovery units, are also encountered in such vat leaching operations. Consequently, the improvements afforded by use of the method of the present invention are also available in such operations.

Activated Carbon Recovery

As already indicated, adsorption onto activated carbon, especially coconut shell carbon, has become a popular method of recovering gold and silver from large volumes of low-grade pregnant solution. Activated carbons have extremely large surface areas per unit of weight, and can adsorb up to 30 thousand ppm of gold in a cyanide complex, leaving a barren solution with only about 0.005 ppm of gold. The simplest use of activated carbon for separating gold and silver from pregnant cyanide solutions is in the form of columns.

Typically in such a system, activated carbon adsorption from heap leached pregnant solutions occurs in a series of four or five columns or tanks, which are usually arranged in an open cascade design with overflow launders on each tank leading to a feed pipe at the bottom of the following tank. Solution velocity and volume are controlled to maintain a suspended bed of carbon in the stream without carrying the carbon away from the system. Once it has been determined by assay that the lead column in the system has become fully loaded with precious metal, it is removed for desorption in accordance with various well known methods, while the next column in line is then allowed to become fully loaded, as determined again by assay. It is then removed for desorption, and the remaining columns in the system are rotated in this manner, with desorbed columns being added at the end to replace the columns removed at the front of the process for desorption. Make-up carbon is added as needed to replace that lost in processing.

Where lime is used to maintain the alkalinity of the cyanide leaching solution, in addition to the problem of calcium carbonate scale deposition in the various portions of the aqueous system involving in the heap leaching process described further above, calcium carbonate also poses a serious problem with regard to the blocking or occlusion of the activated carbon columns involved in stripping the precious metals from the pregnant cyanide solution. Whether this problem arises by reason of the calcium carbonate mechanically obstructing the pores of the activated carbon in particulate form as a macro-scale phenomenon, or by way of direct adsorption of the calcium carbonate ions onto the surface of the activated carbon as a micro-scale phenomenon, or a combination of both of these events, is not known. What is clear, however, is the significant loss in activated carbon column efficiency in separating the precious metals from the pregnant cyanide solution, where lime is used to maintain the alkalinity of the cyanide leaching solution. Thus, the present invention affords a significant improvement in the conventional process of activated carbon recovery of precious metals in the cyanidation process, by inhibiting decreased efficiency of the activated carbon columns by calcium carbonate where lime is used to maintain alkalinity of the cyanide leaching solution.

Carbon-in-Pulp and Carbon-in-Leach Systems

Precious metal extraction systems are currently in use which combine the leaching and activated carbon recovery operations discussed above. One of these has become widely used in mining circuits and can provide from 90 to 99% recovery of precious metals from ores. It is referred to as a carbon-in-pulp system, the leach circuit of which typically consists of a series of mechanical or air agitators in tanks containing a pulp comprising the ore which has been ground, screened, and thickened and conditioned with air and lime. The precious metals are dissolved from the pulp in an oxygenated solution of cyanide and lime. The pulp then flows to a series of tanks in the circuit where it is further contacted with sodium cyanide, lime slurry, and activated carbon that is coarser than the pulp, and onto which the precious metals are adsorbed. Various types of adsorption vessels are used, including mechanical and air agitators, simple propeller tanks, pachuca tanks, and draft tube agitator tanks.

In the adsorption vessels, the leach pulp is moved countercurrent to the flow of the activated carbon, which can be accomplished by a number of well known means. The activated carbon continuously loads precious metal cyanides and, when fully loaded, is air-lifted to screens and moved to stripping vessels. The barren pulp is screened as it leaves the circuit and is disposed of as tails.

Abrasion-resistant activated carbons are required in order to minimize the loss of precious metals which results from the creation of activated carbon fines which are loaded with precious metal cyanides, but pass through screens and become discarded with the barren pulp tails. The activated carbon fines are created as a result of various mechanical steps in the carbon-in-pulp process, and efforts have also been made to minimize the impact of these through various modifications of the process.

Carbon-in-Pulp systems do not entail heap leaching, and thus do not involve calcium carbonate scale formation in the sprinkler or other emitter system utilized for leaching. However, the various parts of the system involved in leaching in a carbon-in-pulp operation are subject to the formation of troublesome calcium carbonate scale, although to a somewhat less significant extent than in heap leaching. On the other hand, the problems associated with occlusion of the activated carbon occur to an equal extent in the carbon-in-pulp system as they do in heap leaching with separate activated carbon column recovery operations.

As described above, a number of designs for carbon-in-pulp systems have involved separate processes for leaching and adsorption. Recently, however, efforts have been made to combine these processes into a single, simultaneous operation, which is referred to as a carbon-in-leach system. In such an operation, the first tanks of the system are used solely for leaching, while subsequent leaching plus activated carbon adsorption goes on simultaneously in the remaining tanks of the system. Thus, a separate adsorption system is not required. In the carbon-in-leach system, as in the carbon-in-pulp system, however, the same problems of calcium carbonate scale formation and occlusion of the activated carbon occur; and thus, the improvement afforded by the method of the present invention is equally available for carbon-in-leach systems.

2. Brief Description of the Prior Art

Because of the high pH's and alkalinity involved in the cyanidation processes described above, conventional agents used to control calcium carbonate scale in more traditional areas such as boilers cannot always be expected to give satisfactory performance. Thus, various polyphosphates, phosphonates, polyacrylates and polymaleic anhydrides have been used heretofore with differing degrees of success. Of particular concern is the fact that some polymer agents, especially the polyacrylates, have been found to cause unacceptable levels of occlusion of the activated carbon employed in separate recovery units or employed in carbon-in-pulp systems.

SUMMARY OF THE INVENTION

The present invention relates to a composition useful as a deposit control agent to control the formation, deposition and adherency of occluding and scale imparting calcium carbonate compounds on various metallic, activated carbon and other surfaces of aqueous systems involved in heap and vat leaching; carbon-in-pulp, carbon-in-leach, and other activated carbon leaching and adsorption recovery systems; and various other mill water circuits used to carry out the basic cyanidation process for extracting precious metals from crude ores, especially low grade ores containing them, where the cyanidation process is combined with the use of activated carbon, utilized in various ways, to recover the precious metals from large volumes of low-grade pregnant solutions containing water soluble cyanide salts of the precious metals created by the leaching step of the cyanidation process;

COMPRISING a polyether polyamino phosphonate of the following formula:

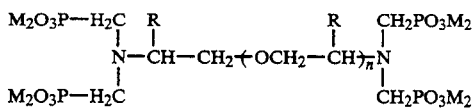

where n is an integer or fractional integer which is, or on average is, from about 2 to about 12, inclusive; M is hydrogen or a suitable cation; and each R may be the same or different and is independently selected from hydrogen and methyl. A preferred subclass of compositions of the above formula is that wherein M is hydrogen, R is methyl, and n is from about 2 to about 3, most preferably an average of about 2.6.

The present invention also relates to a composition useful as a deposit control agent to control the formation, deposition and adherence of occluding and scale imparting calcium carbonate compounds in the basic cyanidation process for extracting precious metals, COMPRISING, in combination, a polyether polyamino methylene phosphonate of the formula above, together with one or more members selected from the group consisting of homo- and copolymers including terpolymers comprising one or more of acrylamide, acrylic acid, 2-acrylamide-methyl propane sulfonic acid, methacrylic acid, itaconic acid, polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, and vinyl phosphonic acid, wherein the weight average molecular weight for such polymer additives is in the range of from about 500 to 250,000. In particular, the present invention relates to such compositions wherein said polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

The present invention further relates to a method of inhibiting the formation, deposition and adherency of occluding and scale imparting calcium carbonate compounds on various metallic, activated carbon and other surfaces of aqueous systems involved in heap and vat leaching; carbon-in-pulp, carbon-in-leach, and other activated carbon leaching and adsorption recovery systems; and various other mill water circuits used to carry out the basic cyanidation process for extracting precious metals from crude ores, especially low grade ores containing them, where the cyanidation process is combined with the use of activated carbon, utilized in various ways, to recover the precious metals from large volumes of low-grade pregnant solutions containing water soluble cyanide salts of the precious metals created by the leaching step of the cyanidation process;

COMPRISING the step of adding to the aqueous systems of said basic cyanidation process an amount sufficient to establish a concentration of from 1 to 100 mg/L of a polyether polyamino methylene phosphonate of the above formula. In particular, the present invention relates to such a method in which calcium carbonate is the scale-forming salt and said phosphonate is added to the aqueous system being treated in an amount sufficient to establish a concentration of from 10 to 50 mg/L.

The present invention further relates to a method of inhibiting the formation, deposition and adherence of occluding and scale-forming calcium carbonate salts in an aqueous system of the basic cyanidation process for extracting precious metals, comprising the step of adding to said system an amount sufficient to establish a concentration of from 1 to 100 mg/L Of a composition comprising a polyether polyamino methylene phosphonate of the formula above, together with one or more members selected from the group consisting of: homo- and copolymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allylory-2-hydroxy propane sulfonic acid (AHPS), and vinyl phosphonic acid, wherein the weight average molecular weight for such polymer additives is in the range of from about 500 to 250,000. In particular, the present invention relates to such a method in which calcium carbonate is the scale-forming salt, said composition is added to the aqueous system being treated in an amount sufficient to establish a concentration of from 10 to 50 mg/L, and said polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

DETAILED DESCRIPTION OF THE INVENTION

The composition of the present invention useful as a deposit control agent to control the formation, deposition and adherency of calcium carbonate scale imparting compounds on various metallic, activated carbon and other surfaces of aqueous systems involved in heap and vat leaching; carbon-in-pulp, carbon-in-leach, and other activated carbon leaching and adsorption recovery systems; and various other mill water circuits used to carry out the basic cyanidation process for extracting precious metals from crude ores, especially low grade ores containing them, where the cyanidation process is combined with the use of activated carbon, utilized in various ways, to recover the precious metals from large volumes of low-grade pregnant solutions containing water soluble cyanide salts of the precious metals created by the leaching step of the cyanidation process; comprises a polyether polyamino methylene phosphonate of the formula:

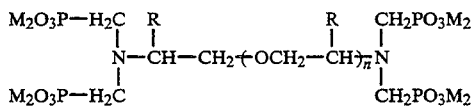

where n is an integer or fractional integer which is, or on average is, from about 2 to about 12, inclusive; M is hydrogen or a suitable cation; and each R may be the same or different and is independently selected from hydrogen and methyl.

A preferred subclass of compositions of the above formula is that wherein M is hydrogen, R is methyl, and n is from about 2 to about 3, most preferably an average of about 2.6.

In order to obtain high levels of control of occlusion and scale deposits, especially under the conditions of high alkalinity and pH which characterize the basic cyanidation process, it has been found that there are certain essential components of the structure of the polyether polyamino methylene phosphonates of the present invention which are necessary to provide that performance. Thus, e.g., the tetra(aminophosphonate) portion of the structure is essential. Whether these groups are present initially in the phosphonic acid form or as an alkali metal or other salt of the acid, has no real bearing on the performance of the overall molecule. At the pH's under which the compositions of the present invention function, they are, and must be, in their ionized form. Thus, it is not critical whether "M" is hydrogen or a suitable cation, and the selection of an appropriate salt form is well within the skill of the art. In addition to alkali metal salts ammonium salts: $NH_4^+$, or ammonium derivative salts: $NR_4^+$ (R=alkyl, etc.), or mixtures thereof, may be used. Alkali metal salts are the most simple, and are preferred for that reason.

A preferred, although not essential structural feature of the polyether polyamino methylene phosphonates useful in the compositions and methods of the present invention is the isopropyl group which bridges the diphosphonomethylamino group and the polyether group. This group can also be an ethylene moiety.

Another structural element of the polyether phosphonates is the polyether moiety. Since the polyether polyamino methylene phosphonates are prepared by phosphonomethylation of the appropriate diamine, the character of the polyether moiety will depend upon the way in which the amine starting material is made. Processes for making such polyether diamines are known in the art; and attention is directed particularly to U.S. Pat. No. 3,236,895, which describes preparation of a variety of polyether diamines especially useful in preparing the phosphonate final products used as deposit control agents in the present invention.

In accordance with the processes set out in U.S. Pat. No. 3,236,895 and related processes described in the prior art, it is possible to prepare any one of a number of desired polyether diamines within the scope of the present invention. In the general formula for the polyether polyamino methylene phosphonates used herein, the polyether moiety is simply represented by the formula above. Since R may be hydrogen or methyl, both ethyleneoxy and propyleneoxy units are possible, as already mentioned. Moreover, R is to be independently chosen, i.e., ethyleneoxy and propyleneoxy units may alternate in various patterns, including blocks of each, or they may be all one or the other. For example, the following are just some of the polyether segments which might be prepared to form the basis for the corresponding diamines, which would then be used to make phosphonates within the scope of the present invention (where EO=ethyleneoxy, and PO=propyleneoxy):

EO; PO; EO-EO; PO-PO; EO-PO; EO-EO-EO; PO-PO-PO; EO-EO-PO; EO-PO-PO; EO-PO-EO; PO-EO-PO; EO-EO-EO-EO; PO-PO-PO-PO; EO-PO-PO-PO; EO-EO-PO-PO; EO-EO-EO-PO; EO-PO-EO-PO; EO-PO-PO-EO; PO-EO-EO-PO

In the above examples, "n" in the main formula would be an integer of from 1 to 4. Since "n" is defined as being from 1 to 12, an even larger number of possible polyether moieties is included. However, it has been found that generally the polyether polyamino methylene phosphonates of lower molecular weight, i.e., where "n" is a smaller integer, are those which provide the greatest amount of scale inhibition under the conditions of high pH which characterize the aqueous systems used in precious metal leaching and recovery described herein, and thus are those which are preferred. Examples of some of these preferred phosphonates are shown in the table below, where Z=methylenephosphonate:

$$Z_2-N-\underset{\underset{R_z}{|}}{C}HCH_2-(OCH_2\underset{\underset{R_a}{|}}{C}H)_a-(OCH_2\underset{\underset{R_b}{|}}{C}H)_b-NZ_2$$

| Id. No. | a | b | $R_z$ | $R_a$ | $R_b$ |
|---|---|---|---|---|---|
| A | 2 | 1 | $CH_3$ | H | $CH_3$ |
| B | 2.6* | 0 | $CH_3$ | $CH_3$ | — |
| C | 2 | 0 | $CH_3$ | $CH_3$ | — |
| D | 8.5* | 1 | $CH_3$ | H | $CH_3$ |
| E | 5.6* | 0 | $CH_3$ | $CH_3$ | — |
| F | 2 | 0 | H | H | — |
| G | 3 | 0 | H | H | — |
| H | 3 | 0 | $CH_3$ | $CH_3$ | — |
| I | 3 | 1 | H | $CH_3$ | H |
| J | 4 | 0 | H | $CH_3$ | — |

* = the value of "n" on average.

It will be noted from the table above that in several cases, "n" has an average value, i.e., the number of repeating ethyleneoxy or propyleneoxy units may vary. Thus, it is possible to have a mixture of varying chain lengths of polyoxyethylene or polyoxypropylene in the final product. This is also contemplated to be within the scope of the present invention, so long as the requirements with respect to the limit of "n" are observed. Consequently, while "n" is merely defined as an integer or fractional integer which is, or on average is, from about 2 to about 12, it has two aspects. It defines the total of the number of repeating ethyleneoxy and/or propyleneoxy units considered separately, and thus if "n" is, e.g., 4, it includes 4 propyleneoxy units, 3 propyleneoxy units and 1 ethyleneoxy unit, 2 propyleneoxy units and 2 ethyleneoxy units, and so forth. The value of "n" may also represent an average number, and this is always the case, of course, when it is a fractional integer. In this case, for each of the ethyleneoxy and/or propyleneox, units considered separately, mixtures of these units may be present so as to give an average value for "n". For example, in the table above, for Id. No. D, the total of "a" and "b" is 9.5, which is the value of "n". What is described is a mixture of polyether phosphonates in which all of them have an isopropyl bridging group and an ethyleneoxy moiety, but the repeating propyleneoxy units are such that on average their value is about 8.5.

The number of repeating ethyleneoxy or oxypropylene units, designated by the subscript "n", determines the total molecular weight of the overall polyether polyamino methylene phosphonate, and thus plays a critical role in determining the scale inhibiting performance of that phosphonate. It has been found that in order to provide adequate scale control under the conditions of use defined herein, it is necessary that "n" be an integer or fractional integer which is, or on average is, from about 2 to about 12, inclusive.

As discussed above, the reason for "n" being potentially a fractional integer arises from the fact that the primary diamine from which the polyether polyamino methylene phosphonates are prepared by phosphonomethylation may be a mixture of polyethers in which "n" is two or more of 2, 3, 4, 5 and so forth, in varying proportions. For example, a preferred polyether polyamino methylene phosphonate for use in the compositions and methods of the present invention has a molecular weight of approximately 632 and the value of "n" on average is about 2.6. Thus, this type of polyether phosphonate has a molecular weight distribution, i.e., of the various polyoxypropylenes which make it up, and this distribution is represented by a fractional integer average value for "n". But, it is also within the scope of the present invention for "n" to be a whole integer, e.g., "3", which usually designates a single molecular weight and not a molecular weight distribution.

The polyether polyamino methylene phosphonates of the compositions and methods of the present invention are prepared first by phosphonomethylation of the appropriate primary diamine which already contains the polyoxyethylene and polyoxypropylene moieties.

Such primary amine starting materials and their method of preparation are well known. The phosphonomethylation of the primary diamine is then carried out by a Mannich reaction such as that described in K. Moedritzer and R. Irani, *J. Organic Chem.* 31(5) 1603–7, "The Direct Synthesis of alpha-Aminomethyl Phosphonic Acids; Mannich-Type Reactions with Orthophosphorous Acid", May 1966. In a typical reaction, the primary diamine is added to a mixture of phosphorous acid and water, and concentrated hydrochloric acid is then added slowly, after which the reaction mixture is heated to reflux with addition of aqueous formaldehyde.

Although the general structural formula employed herein indicates that the nitrogen atom is completely phosphonomethylated, as a practical matter, preparation of the polyether polyamino methylene phosphonates of the present invention, as described in detail further below, usually results in only about 80 to 90% phosphonomethylation. Other side products give N-substitution with H, $CH_3$, $CH_2OH$, etc. It is not practical, as a matter of simple production economics, however, to isolate and purify the completely phosphonomethylated compounds, since the side products just described do not interfere with scale deposit inhibition. Such side products, are consequently, usually allowed to remain, and the test data set out further below is based on test samples containing such side products. Consequently, the activity levels obtained would be even higher were 100% active compound being tested.

When any of the polyether polyamino methylene phosphonate compositions of the present invention are used as deposit control agents to control the formation, deposition and adherency of occluding and scale imparting compounds on various metallic, activated carbon and other surfaces of aqueous systems involved in the basic cyanidation process for extracting precious metals from crude ores, they can be effectively employed for that purpose when added in amounts sufficient to establish a concentration in said aqueous system of from 1 to 100 mg/L. Preferably, the amount added will be sufficient to establish a concentration of from 5 to 75 mg/L, and most preferably, the amount added will be sufficient to establish a concentration of from 10 to 50 mg/L of the composition. It is understood, however, that many factors, of the type which have been explained in detail with regard to the background to the present invention, will determine the actual amount of the polyether polyamino methylene phosphonate compositions of the present invention which will be added to any particular aqueous system in order to achieve the maximum amount of inhibition of alkaline earth metal, especially calcium carbonate scale formation, deposition and adherence in that aqueous system. The calculation of those amounts is well within the skill of the artisan in this field.

When the polyether polyamino methylene phosphonate compositions of the present invention are used in combination with one or more of the polymers recited further above, the amounts of that combination which must be added in order to inhibit the formation, deposition and adherence of occluding and scale-forming salts in an aqueous system, will as a general matter be within the ranges of amounts sufficient to establish the ranges of concentrations of the polyether polyamino methylene phosphonates used alone, as recited in detail above. Again, however, calculation of the actual amount is well within the skill of the art.

The phrases "inhibiting the precipitation" and "inhibiting the formation and deposition" are meant to include threshold inhibition, dispersion, solubilization, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple physical means as opposed to harsh mechanical or chemical treatment.

The phrase "aqueous system" means any of the commercial or industrial systems utilizing water and involved in heap and vat leaching; carbon-in-pulp, carbon-in-leach, and other activated carbon leaching and adsorption recovery systems; and various other mill water circuits used to carry out the basic cyanidation process for extracting precious metals, especially gold and silver, from crude ores, where the cyanidation process is combined with the use of activated carbon, utilized in various ways, to recover the precious metals from large volumes of low-grade pregnant solutions containing water soluble cyanide salts of the precious metals created by the leaching step of the cyanidation process.

The manner of addition of any particular polyether polyamino methylene phosphonate composition of the present invention, to an aqueous system will also be straightforward to a person of ordinary skill in this art. It may be added in liquid form by mechanical dispensers of known design. It may also be added in diluted liquid form. The polyetherpolyamino methylene phosphonate composition may also be combined with other chemical treatment agents for dispensing to the aqueous system; and these in combination may be dispensed in liquid form.

In the embodiments of the present invention described above, it has been contemplated that only a single polyether polyamino methylene phosphonate composition of those described above would be used for the purpose of inhibiting scale. However, it is also contemplated that one of these compositions could be combined with one or more polyelectrolytes so as to provide an even more effective product for the inhibition of scale under the severe conditions described herein.

For example, there could be used in such a combination one or more members selected from the group consisting of homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyethylene glycol monomethacrylate (PGM), maleic anhydride (MA), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid. Weight average molecular weights for such polymer additives should range from about 500 to 250,000.

For example, such compositions include copolymers of 90/10 to 10/90 AA/AMPSA, preferably 75/25 and 60/40 AA/AMPSA. Other preferred polymer additives for use with the polyether polyamino methylenephosphonates of the present invention include 100 AA, 75/25 SSS/MA, 33/33/34 AA/MAA/IA, 50/50 AA/AM, 70/20/10 AA/AMPSA/PGM-5 (having 5 repeating oxyethylene units), and AA/AMPSA/TBAM.

Combinations using these polymers together with the polyether polyamino methylene phosphonate compositions of the present invention can increase the amount of scale control and deposit control which is achieved under the severe conditions described herein. The ratio of polymer additive to phosphonate can be as high as 1:1 down to as little as 1:10, with the preferred range being between 1:2 and 1:5.

What is claimed is:

1. A method of inhibiting the formation, deposition and adherency of occluding and scale imparting calcium carbonate compounds on metallic activated carbon and other surfaces of aqueous systems having a pH of at least 10 involved in heap and vat leaching; carbon-in-pulp, carbon-in-leach, and other activated carbon leaching and adsorption recovery systems; and other mill water circuits used to carry out the cyanidation process for extracting precious metals form crude ores, where the cyanidation process is combined with the use of activated carbon to recover the precious metals from large volumes of low-grade pregnant solutions containing water soluble cyanide salts of the precious metals created by the leaching step of the cyanidation process;

COMPRISING the step of adding to any one or more of the aqueous systems of said cyanidation process an amount sufficient to establish a concentration of from 1 to 100 mg/L of a polyether polyamino methylene phosphonate of the following formula:

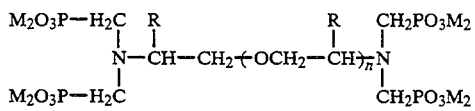

where n is an integer or fractional integer which is, or on average is, from about 2 to about 12, inclusive; M is hydrogen or a cation; and each R may be the same or different and is independently selected from hydrogen and methyl.

2. A method according to claim 1 in which said phosphonate is added to the aqueous system being treated in an amount sufficient to establish a concentration of from 10 to 50 mg/L.

3. A method according to claim 1 wherein in the formula M is hydrogen, R is methyl, and n is, or on average is, from about 2 to about 3.

4. A method according to claim 3 wherein n is an average of about 2.6.

5. A method according to claim 1 wherein the precious metals are gold and silver.

6. A method of inhibiting the formation, deposition and adherence of occluding and scale-forming calcium carbonate salts in an aqueous system of the cyanidation process for extracting precious metals, said aqueous system having a pH of at least 10, comprising the step of adding to said system an amount sufficient to establish a concentration of from 1 to 100 mg/L of a composition comprising a polyether polyamino methylene phosphonate of the following formula:

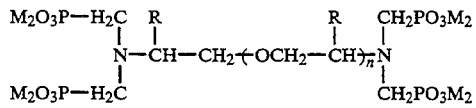

where n is an integer or fractional integer which is, or on average is, from about 2 to about 12, inclusive; M is hydrogen or a cation; and each R may be the same or different and is independently selected from hydrogen and methyl, together with one or more members selected from the group consisting of: homo- and copolymers including terpolymers comprising one or more of acrylamide (AM), acrylic acid (AA), 2-acrylamide-methyl propane sulfonic acid (AMPSA), methacrylic acid (MAA), itaconic acid (IA), polyethylene glycol monomethacrylate (PGM), maleic anhydride (MAH), maleic acid (MA), t-butyl acrylamide (TBAM), solidum styrene sulfonate (SSS), sodium vinyl sulfonate, hydroxy propyl acrylate, hydroxy propyl methacrylate, 3-allyloxy-2-hydroxy propane sulfonic acid, (AHPS), and vinyl phosphonic acid, wherein the weight average molecular weight for such polymer additives is in the range of from about 500 to 250,000.

7. A method according to claim 6 in which said composition is added to the aqueous system being treated in an amount sufficient to establish a concentration of from 10 to 50 mg/L, and said polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5 having 5 repeating oxyethylene units, and AA/AMPSA/TBAM.

8. A method according to claim 7 in which said phosphonate is added to the aqueous system being treated in an amount sufficient to establish a concentration of from 10 to 50 mg/L.

9. A method according to claim 7 wherein in the formula M is hydrogen, R is methyl, and n is, or on average is, from about 2 to about 3.

10. A method according to claim 9 wherein n is an average of about 2.6.

11. A method according to claim 10 wherein the precious metals are gold and silver.

* * * * *